United States Patent
Rosson

[19]
[11] Patent Number: 6,130,977
[45] Date of Patent: Oct. 10, 2000

[54] FIBER OPTIC CONNECTOR SLEEVE HAVING POSITIONING RIBS

[75] Inventor: Joel C. Rosson, Hickory, N.C.

[73] Assignee: Siecor Operations, LLC, Hickory, N.C.

[21] Appl. No.: 09/118,440

[22] Filed: Jul. 17, 1998

[51] Int. Cl.[7] .................................................. G02B 6/36
[52] U.S. Cl. ........................... 385/76; 385/55; 385/76; 385/77; 385/70
[58] Field of Search ............................. 385/53, 54, 55, 385/76, 77, 79, 88, 70

[56] References Cited

U.S. PATENT DOCUMENTS

| | | | |
|---|---|---|---|
| 4,410,365 | 10/1983 | Burger et al. | 350/93.2 |
| 5,214,730 | 5/1993 | Nagasawa et al. | 385/59 |
| 5,363,460 | 11/1994 | Marazzi et al. | 385/70 |
| 5,386,487 | 1/1995 | Briggs et al. | 385/59 |
| 5,675,682 | 10/1997 | De Marchi | 385/77 |

FOREIGN PATENT DOCUMENTS

| | | | |
|---|---|---|---|
| 63239408 | 5/1988 | European Pat. Off. | G02B 6/38 |
| 0823649A1 | 8/1998 | European Pat. Off. | G02B 6/38 |
| 62-56907 | 3/1987 | Japan | G02B 6/40 |
| 62-69213 | 3/1987 | Japan | G02B 6/38 |
| 9-258065 | 10/1997 | Japan | G02B 6/38 |

*Primary Examiner*—Darren E. Schuberg
*Assistant Examiner*—Fayez Assaf

[57] ABSTRACT

A fiber optic connector sleeve is provided which includes a sleeve housing defining a lengthwise extending passageway and a number of positioning ribs extending lengthwise through the passageway for engaging a fiber optic connector and for positioning the fiber optic connector within the fiber optic connector sleeve. For a sleeve housing defining a passageway having a number of corners in lateral cross-section, the positioning ribs are generally located in respective corners of the passageway in order to engage corresponding corner portions of the fiber optic connector. Additionally, the interior sidewalls of the sleeve housing that extend between the positioning ribs are typically recessed relative to the positioning ribs so as to provide clearance during the insertion of the fiber optic connector into the fiber optic connector sleeve. Moreover, the recessed interior sidewalls of the sleeve housing can be tapered in a lengthwise extending direction to facilitate molding of the fiber optic connector sleeve.

22 Claims, 3 Drawing Sheets

FIBER OPTIC CONNECTOR SLEEVE HAVING POSITIONING RIBS

FIELD OF THE INVENTION

The present invention relates generally to fiber optic connector sleeves and, more particularly, to fiber optic connector sleeves having positioning ribs for facilitating the insertion and alignment of one or more fiber optic connectors.

BACKGROUND OF THE INVENTION

Fiber optic connector sleeves are frequently utilized to facilitate the mating of one or more fiber optic connectors. In this regard, a pair of fiber optic connectors can be inserted into the opposed ends of a fiber optic connector sleeve. The fiber optic connector sleeve serves to align the fiber optic connectors to some degree such that the optical fibers upon which the fiber optic connectors are mounted are also appropriately aligned. As such, fiber optic connector sleeves can be mounted to a patch panel or within an enclosure or like so as to align a pair of fiber optic connectors inserted into opposite ends of the fiber optic connector sleeve.

However, fiber optic connector sleeves can also be adapted to receive only a single fiber optic connector inserted through one end thereof. Even in this instance, however, the fiber optic connector sleeve is adapted to align the optical fiber(s) upon which the fiber optic connector is mounted with optical fiber(s), an optical signal source or other optical components that are mounted in a predefined aligned relationship to the fiber optic connector sleeve. For example, a fiber optic connector that is adapted to receive only a single fiber optic connector can be mounted to an enclosure or a housing, such as the housing of a computer or a telephone, in order to optically connect the optical fibers upon which the fiber optic connector is mounted with optical components within the enclosure or housing.

Although fiber optic connector sleeves can have a variety of shapes and sizes, typical fiber optic connector sleeves for multifiber connectors, such as MTP connectors, are rectangular in lateral cross-section and define a lengthwise extending passageway that also has a generally rectangular shape in lateral cross-section. As such, these conventional fiber optic connector sleeves can receive and align fiber optic connectors having an outer housing with a corresponding rectangular shape in lateral cross-section.

Conventional fiber optic connector sleeves are molded from a plastic material. As such, the lengthwise extending passageway must generally have some draft or be tapered at least somewhat in a lengthwise extending direction in order to permit the mold pins to be removed from the passageway once the fiber optic connector sleeve has been molded thereabout. However, the outer housings of the fiber optic connectors that are inserted into these conventional fiber optic connector sleeves are not tapered so as to match the passageway defined by the connector sleeve. As such, some movement of the fiber optic connectors relative to the fiber optic connector sleeve is permitted, thereby reducing the precision with which a conventional fiber optic connector sleeve aligns the fiber optic connector.

Additionally, the sidewalls of a conventional fiber optic connector sleeve generally bow inward following removal of the molding pins. As will be apparent, this bowing of the sidewalls of a fiber optic connector sleeve further reduces the precision with which a fiber optic connector sleeve can align fiber optic connectors.

In order to more precisely align the fiber optic connectors within a fiber optic connector sleeve, multifiber connectors typically include guide pins which extend outwardly from the ferrule of one of the multifiber connectors for insertion into corresponding openings defined by the ferrule of the other fiber optic connector. As such, conventional fiber optic connector sleeves generally provide a relatively coarse alignment for the fiber optic connectors, while the guide pins that extend between the respective ferrules provide for the precise alignment of the fiber optic connectors.

Depending upon the manner in which the sidewalls of the fiber optic connector sleeve bow following molding and the extent to which the passageway defined by the fiber optic connector sleeve is tapered, some fiber optic connector sleeves may fail to sufficiently align the fiber optic connectors such that the guide pins of one fiber optic connector can readily engage the corresponding openings defined by the ferrule of the other fiber optic connector. The problems created by this misalignment are particularly evident for the smaller fiber optic connectors, such as mini-MTP connectors which include mini-MT ferrules. As a result of their reduced size, these fiber optic connectors generally include much smaller guide pins which extend outwardly from the ferrule of one fiber optic connector for engaging the much smaller openings defined by the ferrule of the other fiber optic connector. Because of the reduced size of the guide pins and the openings in which the guide pins must be inserted, smaller amounts of misalignment, such as misalignment created by bowing of the sidewalls of the fiber optic connector sleeve or tapering of the passageway defined by the fiber optic connector sleeve, can result in significant misalignment of the fiber optic connectors and, more particularly, the optical fibers upon which the fiber optic connectors are mounted.

While fiber optic connector sleeves are widely available, it would nevertheless be desirable to provide a fiber optic connector sleeve which can align the fiber optic connectors inserted into the fiber optic connector sleeve with more precision. In addition, it would be desirable to provide a fiber optic connector sleeve which could be manufactured, such as by molding, without impairing or otherwise reducing the alignment provided by the fiber optic connector sleeve, such as by requiring the features utilized for alignment to be tapered.

SUMMARY OF THE INVENTION

A fiber optic connector sleeve is provided according to the present invention which precisely aligns fiber optic connectors and which can be readily manufactured, such as by molding, without impairing the alignment precision provided by the fiber optic connector sleeve. According to the present invention, the fiber optic connector sleeve includes a sleeve housing defining a lengthwise extending passageway for receiving at least a portion of a fiber optic connector, such as the forward end of a fiber optic connector. The sleeve housing includes a plurality of positioning ribs extending lengthwise through the passageway for engaging the fiber optic connector and for positioning the fiber optic connector within the fiber optic connector sleeve. According to one advantageous embodiment, the positioning ribs extend into the passageway from locations proximate at least two of the corners of the passageway to provide proper alignment of the fiber optic connector. Between the positioning ribs, however, the interior sidewalls of the sleeve housing are recessed relative to the positioning ribs to provide clearance and therefore facilitate insertion of the fiber optic connector into the fiber optic connector sleeve. According to one advantageous embodiment, the interior sidewalls of the sleeve housing extending between the positioning ribs are tapered in a lengthwise extending direction, thereby facilitating the manufacturing and, more particularly, the molding of the fiber optic connector sleeve.

In one advantageous embodiment, the sleeve housing includes a plurality of walls that intersect to define a plurality of corners. For example, the sleeve housing can have a generally rectangular shape in lateral cross-section so as to define four corners. As such, the fiber optic connector sleeve of one advantageous embodiment includes four positioning ribs disposed in respective ones of the four corners of the passageway. Regardless of the number of positioning ribs, each positioning rib of one advantageous embodiment has an L-shape in lateral cross-section so as to include a first portion that extends lengthwise along one of the walls that define the respective corner and a second portion that extends lengthwise along the other of the walls that define the respective corner.

Preferably, each positioning rib extends parallel to the lengthwise extending axis of the passageway and is untapered. As such, the positioning ribs can engage corresponding portions of the untapered outer housing of a fiber optic connector, such as the corner portions of the outer housing of a fiber optic connector, as the fiber optic connector is inserted into the fiber optic connector sleeve, thereby controllably positioning the fiber optic connector within the fiber optic connector sleeve and appropriately aligning the optical fibers upon which the fiber optic connector is mounted with other optical fibers.

In embodiments in which the recessed interior sidewalls of the sleeve housing are tapered in a lengthwise extending direction, the recessed interior sidewalls preferably taper inwardly in a lengthwise extending direction from an end portion of the sleeve housing toward a medial portion of the sleeve housing. As such, the molding pins about which the fiber optic connector sleeve is molded can be readily withdrawn from the fiber optic connector sleeve following the molding process, even though the positioning ribs are untapered. In this regard, the cumulative width of the recessed interior sidewalls of the sleeve housing in lateral cross-section is preferably greater than the cumulative width of the positioning ribs in lateral cross-section such that sufficient draft is provided by the fiber optic connector sleeve of the present invention to remove the molding pins.

Therefore, the fiber optic connector sleeve of the present invention which includes a sleeve housing having positioning ribs extending lengthwise therethrough provides precise alignment for fiber optic connectors inserted into the fiber optic connector sleeve, including relatively small or miniature fiber optic connectors. By permitting the interior sidewalls of the sleeve housing which extend between the positioning ribs to be recessed relative to the positioning ribs, however, the fiber optic connector sleeve of the present invention can be readily manufactured, such as by molding, without impairing the precision with which the resulting fiber optic connector sleeve aligns fiber optic connectors. In addition, the tolerances to which the recessed interior sidewalls are constructed can be relaxed since the recessed interior sidewalls do not contact the fiber optic connector, thereby further simplifying the manufacturing process.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
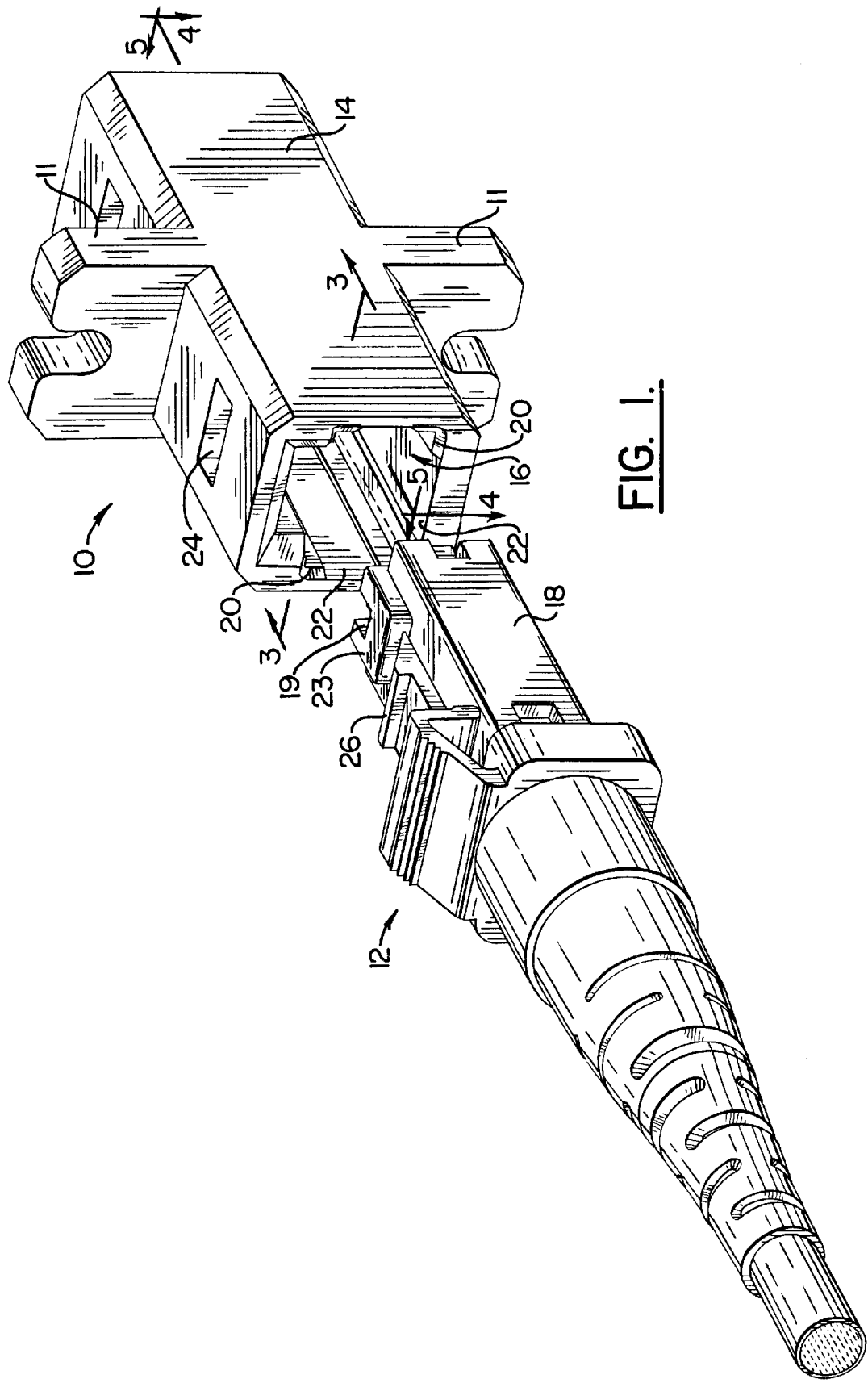
FIG. 1 is a perspective view illustrating a fiber optic connector being inserted into a fiber optic connector sleeve according to one advantageous embodiment of the present invention.

Referring now to FIG. 1, a fiber optic connector sleeve 10 according to one advantageous embodiment of the present invention is illustrated. Although the fiber optic connector sleeve that is illustrated and will be described hereinafter is designed to receive a pair of fiber optic connectors 12 from opposite ends of the fiber optic connector sleeve, the term "fiber optic connector sleeve" as used herein is intended to also encompass jacks, adapters or the like and can therefore be readily configured to receive only a single fiber optic connector through one end of the fiber optic connector sleeve and to align the optical fibers upon which the fiber optic connector is mounted with other optical fibers or optical elements that are disposed in a fixed position relative to the fiber optic connector sleeve. For example, the fiber optic connector sleeve can be embodied as a jack that is mounted to the housing of a computer or a telephone so as to receive a single fiber optic connector and to align the optical fibers upon which the fiber optic connector is mated with optical fibers or other optical components within the housing.

Additionally, while the fiber optic connector sleeve 10 is shown to be unattached for purposes of illustration, the fiber optic connector sleeve is typically mounted, such as to a patch panel or within an enclosure or the like, for receiving one and, more commonly, a pair of fiber optic connectors. For example, the fiber optic connector sleeve can include a pair of flanges 11 that extend outwardly from a medial portion of the fiber optic connector sleeve for facilitating mounting of the fiber optic connector sleeve to a patch panel or the like.

The fiber optic connector sleeve 10 includes a sleeve housing 14 defining a lengthwise extending passageway 16 for receiving the leading or forward end of a fiber optic connector 12. In particular, the passageway defined by the sleeve housing is adapted to receive the outer housing 18 of the fiber optic connector. While the fiber optic connector sleeve could be used in conjunction with single fiber connectors, the fiber optic connector sleeve of the present invention is particularly well suited for receiving and aligning multifiber connectors.

Figure 2:
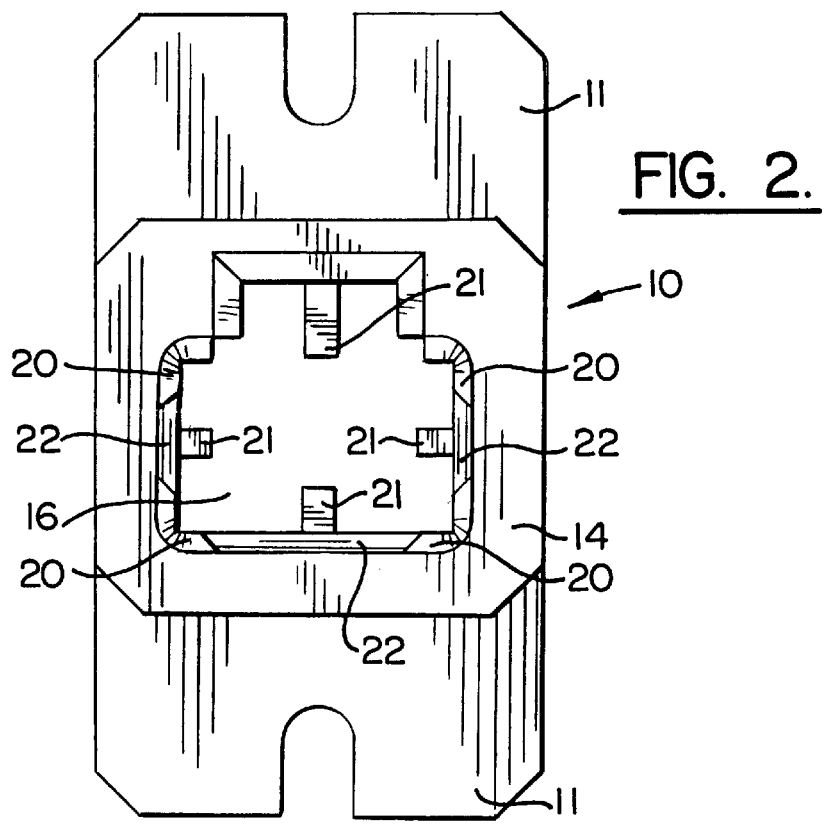
FIG. 2 is a plan view of one end of the fiber optic connector sleeve of FIG. 1.
Figure 3:
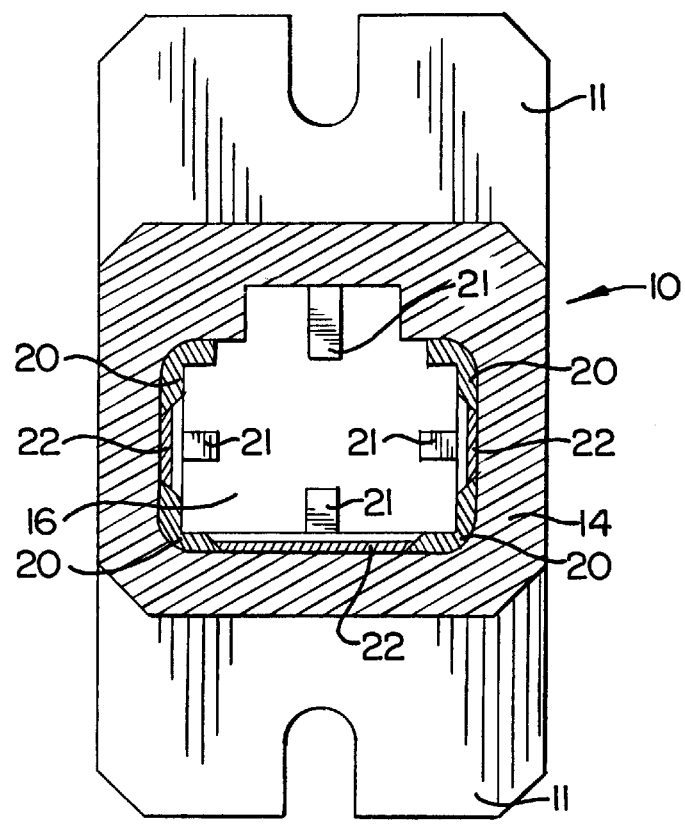
FIG. 3 is a lateral cross-sectional view of the fiber optic connector sleeve of FIG. 1 taken along line 3—3.

As shown in FIGS. 2 and 3, the sleeve housing 14 includes sidewalls that define a lengthwise extending passageway 16. The sleeve housing can be shaped so as to define a passageway having a variety of shapes in lateral cross-section, including a passageway having a generally circular shape in lateral cross-section for receiving a generally cylindrical fiber optic connector 12. Typically, however, the passageway has a generally rectangular shape in lateral cross-section so as to define four corners.

According to the present invention, the sleeve housing 14 includes a plurality of positioning ribs 20 extending lengthwise through the passageway 16. As shown in cross-section in FIGS. 4 and 5, the positioning ribs generally extend lengthwise from the opposed ends of the fiber optic connector sleeve 10 to a medial portion of the fiber optic connector sleeve. Although the positioning ribs can extend lengthwise through the entire fiber optic connector sleeve, the positioning ribs typically terminate or are interrupted in a medial portion of the fiber optic connector sleeve which includes various other alignment features, such as the projections 21 which are designed to engage corresponding castellations 19 defined by the forward end of the fiber optic connector.

The positioning ribs 20 engage the fiber optic connector 12 and position the fiber optic connector within the fiber optic connector sleeve 10. In particular, the positioning ribs engage corresponding portions of the outer housing 18 of the fiber optic connector in order to appropriately position the fiber optic connector within the fiber optic connector sleeve. Preferably, the positioning ribs extend into the passageway 16 from locations proximate at least two corners of the passageway. More preferably, the positioning ribs extend into the passageway from each of the corners of the passageway in order to align the fiber optic connector within the passageway defined by the fiber optic connector sleeve. As shown in FIGS. 1–3, for example, for a sleeve housing 14 which defines a passageway having a generally rectangular shape in lateral cross-section with four corners, the sleeve housing preferably includes four positioning ribs located proximate respective ones of the four corners of the passageway.

As also illustrated in FIGS. 2 and 3, the sleeve housing 14 of one advantageous embodiment includes positioning ribs 20 which have a L-shape in lateral cross-section. In other words, each positioning rib of this advantageous embodiment includes a first portion that extends lengthwise along one of the walls that define the respective corner and a second portion that extends lengthwise along the other wall that defines the respective corner. As such, the positioning ribs can engage corresponding corners of the outer housing 18 of the fiber optic connector 12 that is inserted through the end of the fiber optic connector sleeve 10 and can serve essentially as a track to guide the fiber optic connector lengthwise through the passageway 16 defined by the fiber optic connector sleeve.

Figure 4:
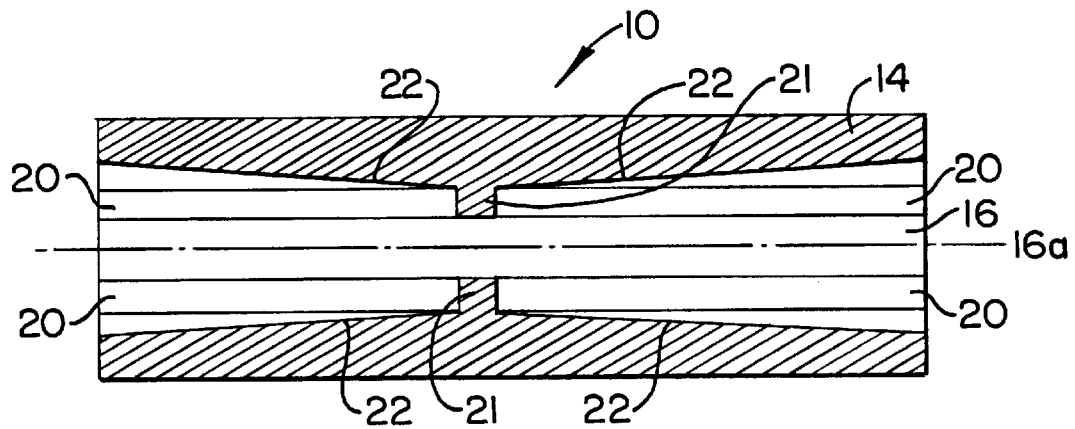
FIG. 4 is a longitudinal cross-sectional view of the fiber optic connector sleeve of FIG. 1 taken along line 4—4.
Figure 5:
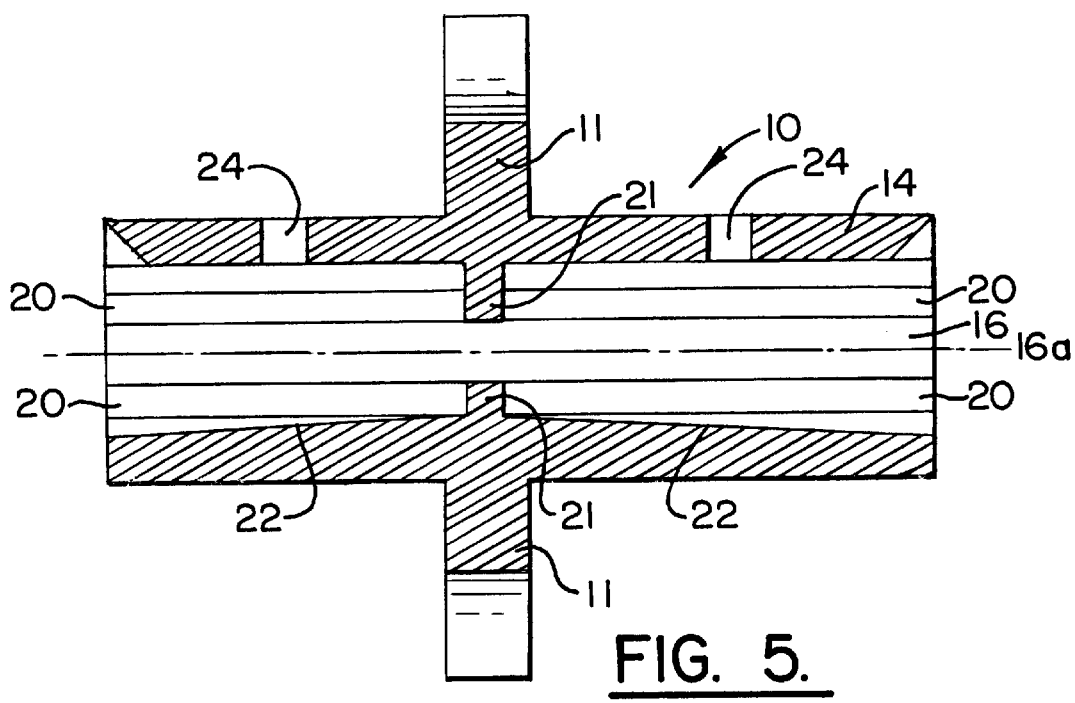
FIG. 5 is a longitudinal cross-sectional view of the fiber optic connector of FIG. 1 taken along line 5—5.

As shown in longitudinal cross-section in FIGS. 4 and 5, the positioning ribs 20 preferably extend parallel to a lengthwise extending axis 16a defined by the passageway 16. The positioning ribs are therefore untapered in a lengthwise extending direction. As such, the positioning ribs will serve to engage and align a fiber optic connector 12 having an untapered outer housing 18 throughout the length of the fiber optic connector sleeve 10. As shown in FIG. 1, however, the portions of the positioning ribs immediately adjacent the opposed ends of the fiber optic connector sleeve can be beveled or chamfered in order to provide a lead-in feature that facilitates insertion of the fiber optic connector into the fiber optic connector sleeve.

The sleeve housing 14 of the fiber optic connector sleeve 10 of the present invention also includes interior sidewalls 22 extending between the positioning ribs 20 that are recessed relative to the positioning ribs. By being recessed relative to the positioning ribs, these interior sidewalls of the sleeve housing facilitate insertion of the fiber optic connector 12 into the fiber optic connector sleeve 10 by providing clearance between the fiber optic connector and the fiber optic connector sleeve so that the recessed interior sidewalls do not frictionally engage or otherwise contact the outer housing 18 of the fiber optic connector. As a result of the engagement of the outer housing of the fiber optic connector by the positioning ribs, however, the fiber optic connector is precisely aligned within the fiber optic connector sleeve even without engagement of the outer housing of the fiber optic connector by the recessed interior sidewalls of the sleeve housing.

By being recessed relative to the positioning ribs 20 so as not to engage the fiber optic connector 12, the interior sidewalls 22 of the sleeve housing 14 can have increased or otherwise more relaxed tolerances since the recessed interior sidewalls do not contribute to the alignment of the fiber optic connector 12 within the fiber optic connector sleeve 10. As a result, the design of the fiber optic connector sleeve of the present invention facilitates its manufacture due to the increased acceptable tolerances for the recessed interior sidewalls.

As described above in conjunction with conventional fiber optic connector sleeves, the fiber optic connector sleeve 10 of the present invention is preferably molded from a plastic material by molding about mold pins which define the passageway 16 through the sleeve housing 14 of the resulting fiber optic connector sleeve. Since the positioning ribs 20 are untapered so as to engage and provide alignment for the fiber optic connector 12 throughout the length of the fiber optic connector sleeve, the recessed interior sidewalls 22 of the sleeve housing are preferably tapered in a lengthwise extending direction. In particular, the recessed interior sidewalls of the sleeve housing preferably taper inwardly in a lengthwise extending direction from an end portion of the sleeve housing toward a medial portion of the sleeve housing as shown in FIGS. 4 and 5. As a result, the recessed interior sidewalls provide draft such that the mold pins can be removed from the passageway following molding of the fiber optic connector sleeve about the mold pins. While the recessed interior sidewalls can be tapered or sloped at a variety of angles, the recessed interior sidewalls of one advantageous embodiment are tapered at an angle of about $\frac{1}{40}$ relative to the lengthwise extending axis 16a defined by the passageway.

In order to further facilitate the removal of the mold pins from the passageway 16 of the resulting fiber optic connector sleeve 10, the cumulative width of the recessed interior sidewalls 22 of the sleeve housing 14 in lateral cross-section is preferably greater than the cumulative width of the positioning ribs 20 in lateral cross-section. In other words, a greater percentage of the surface area of the interior sidewalls which define the passageway of the sleeve housing is preferably comprised of the recessed interior sidewalls than the positioning ribs.

Since the recessed interior sidewalls 22 generally form a greater percentage of the inner circumferences of the sleeve housing 14 than the positioning ribs 20, any bowing of the walls of the sleeve housing following molding of the fiber optic connector sleeve 10 will primarily effect the recessed interior sidewalls of the sleeve housing. Since these recessed interior sidewalls are spaced from the outer housing 18 of any fiber optic connector 12 inserted into the fiber optic connector sleeve, bowing of the recessed interior sidewalls will not generally affect the alignment of the fiber optic connector within the fiber optic connector sleeve, i.e., the amount of bowing will generally be less than the amount by which the interior sidewalls are recessed relative to the positioning ribs. For this additional reason, the alignment provided by the fiber optic connector sleeve of the present invention is therefore further improved relative to conventional fiber optic connector sleeves.

Following installation of the fiber optic connector sleeve 10, such as by mounting the fiber optic connector sleeve to a patch panel or within an enclosure or the like, a fiber optic connector 12, such as the multifiber connector illustrated in FIG. 1, can be inserted through an end portion of the fiber optic connector sleeve. For fiber optic connectors that include an alignment key 23 as shown in FIG. 1, the alignment key of the fiber optic connector is initially aligned with a correspondingly enlarged portion of the passageway 16 and the fiber optic connector is thereafter inserted into the passageway. As described above, the fiber optic connector and, more particularly, the corners of the outer housing 18 of the fiber optic connector are engaged by the positioning ribs 20 of the sleeve housing 14 of the fiber optic connector sleeve and are guided through the passageway during insertion of the fiber optic connector into the fiber optic connector sleeve.

As a result of the precision with which the positioning ribs 20 are defined, the positioning ribs serve to align the fiber optic connector 12 with another fiber optic connector inserted through the opposite end of the fiber optic connector sleeve 10 or with other optical elements. As such, the optical fibers upon which the fiber optic connectors are mated can be aligned. For fiber optic connectors that include guide pins, the alignment afforded by the positioning ribs of the fiber optic connector sleeve of the present invention effectively aligns the guide pins of one fiber optic connector with corresponding openings defined by the ferrule of the other fiber optic connector, thereby further aligning the optical fibers upon which the fiber optic connectors are mounted. As shown in FIG. 1, the sleeve housing of the fiber optic connector sleeve can also define a window 24 for receiving a corresponding latch 26 of the fiber optic connector in order to secure the fiber optic connector within the fiber optic connector sleeve following its insertion therein.

As described above, the fiber optic connector sleeve 10 of the present invention which includes a sleeve housing 14 having lengthwise extending positioning ribs 20 provides precise alignment for fiber optic connectors 12 inserted into the fiber optic connector sleeve, including relatively small or miniature fiber optic connectors. By permitting the interior sidewalls 22 of the sleeve housing which extend between the positioning ribs to be recessed relative to the positioning ribs, however, the fiber optic connector sleeve of the present invention can be readily manufactured, such as by molding, without impairing the precision with which the resulting fiber optic connector sleeve aligns fiber optic connectors. In addition, the tolerances to which the recessed interior sidewalls are constructed can be relaxed since the recessed interior sidewalls do not generally contact the fiber optic connector, thereby further simplifying the manufacturing process.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A fiber optic connector sleeve comprising:
    a sleeve housing defining a lengthwise extending passageway for receiving at least a portion of a fiber optic connector, wherein the passageway defined by said sleeve housing has a plurality of corners in lateral cross-section,
    wherein said sleeve housing comprises a plurality of positioning ribs extending lengthwise through the passageway for engaging the fiber optic connector and for positioning the fiber optic connector within the fiber optic connector sleeve, and wherein the positioning ribs extend into the passageway from locations proximate at least two of the corners of the passageway such that interior sidewalls of said sleeve housing extending between the positioning ribs are recessed relative to the positioning ribs so as to prevent the connector from engaging the interior sidewalls during insertion of the fiber optic connector into the fiber optic connector sleeve.

2. A fiber optic connector sleeve according to claim 1 wherein said sleeve housing comprises a plurality of walls that intersect to define the plurality of corners, wherein each positioning rib is located in a respective corner of the passageway and has an L-shape in lateral cross-section, and wherein each positioning rib comprises:
    a first portion that extends lengthwise along one of the walls that define the respective corner; and
    a second portion that extends lengthwise along the other of the walls that define the respective corner.

3. A fiber optic connector sleeve according to claim 1 wherein the passageway defined by said sleeve housing has a generally rectangular shape in lateral cross-section which defines four corners, and wherein said sleeve housing comprises four positioning ribs disposed in respective ones of the four corners of the passageway.

4. A fiber optic connector sleeve according to claim 1 wherein the passageway defines a lengthwise extending axis, and wherein the positioning ribs extend parallel to the lengthwise extending axis of the passageway such that the positioning ribs are untapered.

5. A fiber optic connector sleeve according to claim 4 wherein the recessed interior sidewalls of said sleeve housing are tapered inwardly in a lengthwise extending direction from an end portion of said sleeve housing toward a medial portion of said sleeve housing.

6. A fiber optic connector sleeve according to claim 1 wherein the cumulative width of the recessed interior sidewalls of said sleeve housing in lateral cross-section is greater than the cumulative width of the positioning ribs in lateral cross-section.

7. A fiber optic connector sleeve comprising:
    a sleeve housing defining a lengthwise extending passageway for receiving at least a portion of a fiber optic connector,
    wherein said sleeve housing comprises a plurality of positioning ribs extending lengthwise through the passageway for engaging the fiber optic connector and for positioning the fiber optic connector within the fiber optic connector sleeve, and
    wherein interior sidewalls of said sleeve housing extending between the positioning ribs are recessed relative to the positioning ribs and are tapered in a lengthwise extending direction to thereby facilitate insertion of the fiber optic connector into the fiber optic connector sleeve.

8. A fiber optic connector sleeve according to claim 7 wherein the passageway defined by said sleeve housing has a plurality of corners in lateral cross-section, and wherein the positioning ribs extend into the passageway from locations proximate at least two of the corners of the passageway.

9. A fiber optic connector sleeve according to claim 8 wherein said sleeve housing comprises a plurality of walls that intersect to define the plurality of corners, wherein each positioning rib is located in a respective corner of the passageway and has an L-shape in lateral cross-section, and wherein each positioning rib comprises:

a first portion that extends lengthwise along one of the walls that define the respective corner; and a second portion that extends lengthwise along the other of the walls that define the respective corner.

10. A fiber optic connector sleeve according to claim 8 wherein the passageway defined by said sleeve housing has a generally rectangular shape in lateral cross-section which defines four corners, and wherein said sleeve housing comprises four positioning ribs disposed in respective ones of the four corners of the passageway.

11. A fiber optic connector sleeve according to claim 7 wherein the passageway defines a lengthwise extending axis, and wherein the positioning ribs extend parallel to the lengthwise extending axis of the passageway such that the positioning ribs are untapered.

12. A fiber optic connector sleeve according to claim 11 wherein the recessed interior sidewalls of said sleeve housing are tapered inwardly in a lengthwise extending direction from an end portion of said sleeve housing toward a medial portion of said sleeve housing.

13. A fiber optic connector sleeve according to claim 7 wherein the cumulative width of the recessed interior sidewalls of said sleeve housing in lateral cross-section is greater than the cumulative width of the positioning ribs in lateral cross-section.

14. A fiber optic connector assembly comprising:

a fiber optic connector adapted to be mounted upon an end portion of an optical fiber; and a fiber optic connector sleeve comprising a sleeve housing defining a lengthwise extending passageway for receiving at least a portion of said fiber optic connector, wherein the passageway defined by said sleeve housing has a plurality of corners in lateral cross-section, and wherein said sleeve housing comprises a plurality of positioning ribs extending lengthwise through the passageway and extending into the passageway from locations proximate at least two of the corners of the passageway for engaging the fiber optic connector and for positioning the fiber optic connector within said fiber optic connector sleeve, each positioning rib having an L-shape in lateral cross-section.

15. A fiber optic connector assembly according to claim 14 wherein said sleeve housing comprises a plurality of walls that intersect to define plurality of corners, wherein each positioning rib is located in a respective corner of the passageway, and wherein each positioning rib comprises:

a first portion that extends lengthwise along one of the walls that define the respective corner; and a second portion that extends lengthwise along the other of the walls that define the respective corner.

16. A fiber optic connector assembly according to claim 14 wherein the passageway defined by said sleeve housing has a generally rectangular shape in lateral cross-section which defines four corners, and wherein said sleeve housing comprises four positioning ribs disposed in respective ones of the four corners of the passageway.

17. A fiber optic connector assembly according to claim 14 wherein the passageway defines a lengthwise extending axis, and wherein the positioning ribs extend parallel to the lengthwise extending axis of the passageway such that the positioning ribs are untapered.

18. A fiber optic connector assembly according to claim 14 wherein interior sidewalls of said sleeve housing extending between the positioning ribs are recessed relative to the positioning ribs to thereby provide clearance during insertion of said fiber optic connector into said fiber optic connector sleeve.

19. A fiber optic connector assembly according to claim 18 wherein the recessed interior sidewalls of said sleeve housing are tapered inwardly in a lengthwise extending direction from an end portion of said sleeve housing toward a medial portion of said sleeve housing.

20. A fiber optic connector assembly according to claim 18 wherein the cumulative width of the recessed interior sidewalls of said sleeve housing in lateral cross-section is greater than the cumulative width of the positioning ribs in lateral cross-section.

21. A fiber optic connector sleeve comprising:

a sleeve housing defining a lengthwise extending passageway for receiving at least a portion of a fiber optic connector, wherein the passageway defined by said sleeve housing has a plurality of corners in later cross-section;

wherein said sleeve housing comprises a plurality of positioning ribs extending lengthwise through the passageway for engaging the fiber optic connector and for positioning the fiber optic connector within the fiber optic connector sleeve, and wherein the positioning ribs extend into the passageway from locations proximate at least two of the corners of the passageway such that interior sidewalls of said sleeve housing extending between the positioning ribs are recessed relative to the positioning ribs to thereby provide clearance during insertion of the fiber optic connector into the fiber optic connector sleeve, and wherein the passageway defines a lengthwise extending axis, and wherein the positioning ribs extend parallel to the lengthwise extending axis of the passageway such that the positioning ribs are untapered and the recessed interior sidewalls of said sleeve housing are tapered inwardly in a lengthwise extending direction form an end portion of said sleeve housing toward a medial portion of said sleeve housing.

22. A fiber optic connector assembly comprising:

a fiber optic connector adapted to be mounted upon an end portion of an optical fiber; and a fiber optic connector sleeve comprising a sleeve housing defining a lengthwise extending passageway for receiving at least a portion of a fiber optic connector, wherein the passageway defined by said sleeve housing has a plurality of corners in lateral cross-section and wherein said sleeve housing comprises a plurality of positioning ribs extending lengthwise through the passageway and extending into the passageway from locations proximate at least two of the corners of the passageway for engaging the fiber optic connector and for positioning the fiber optic connector within the fiber optic connector sleeve, and wherein interior sidewalls of said sleeve housing extending between the positioning ribs are recessed relative to the positioning ribs to thereby provide clearance during insertion of the fiber optic connector into the fiber optic connector sleeve, and wherein the recessed interior sidewalls of said sleeve housing are tapered inwardly in a lengthwise extending direction from an end portion of said sleeve housing toward a medial portion of said sleeve housing.

* * * * *